United States Patent
Lee et al.

(10) Patent No.: US 11,121,925 B2
(45) Date of Patent: Sep. 14, 2021

(54) IOT NETWORK MANAGEMENT METHOD FOR MANAGING LORAWAN-BASED LARGE-SCALE FACILITIES, AND IOT NETWORK SERVER AND TERMINAL APPLYING THE SAME

(71) Applicant: Korea Electronics Technology Institute, Seongnam-si (KR)

(72) Inventors: Seung Woo Lee, Seongnam-si (KR); Young Min Kwon, Seongnam-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 221 days.

(21) Appl. No.: 16/465,801

(22) PCT Filed: Dec. 14, 2017

(86) PCT No.: PCT/KR2017/014682
§ 371 (c)(1),
(2) Date: May 31, 2019

(87) PCT Pub. No.: WO2019/117349
PCT Pub. Date: Jun. 20, 2019

(65) Prior Publication Data
US 2021/0099349 A1 Apr. 1, 2021

(30) Foreign Application Priority Data
Dec. 13, 2017 (KR) .................. 10-2017-0170913

(51) Int. Cl.
*H04L 12/24* (2006.01)
*H04W 4/80* (2018.01)
*H04W 88/16* (2009.01)

(52) U.S. Cl.
CPC ...... *H04L 41/0893* (2013.01); *H04L 41/0806* (2013.01); *H04W 4/80* (2018.02); *H04W 88/16* (2013.01)

(58) Field of Classification Search
CPC .. H04L 41/0893; H04L 41/0806; H04W 4/80; H04W 88/16
See application file for complete search history.

(56) References Cited

U.S. PATENT DOCUMENTS 9,888,385 B1 * 2/2018 Oh ...................... H04W 12/069
10,880,743 B1 * 12/2020 Berzin ................ H04L 41/0806
(Continued)

FOREIGN PATENT DOCUMENTS

| KR | 10-2017-0059319 A | 5/2017 |
| WO | 2017/137881 A1 | 8/2017 |
| WO | 2017/146342 A1 | 8/2017 |

OTHER PUBLICATIONS

Korean Office Action dated Nov. 28, 2018 for corresponding Korean Application No. 10-2017-0170913, citing the above references.
(Continued)

*Primary Examiner* — Philip J Chea
*Assistant Examiner* — Hassan A Khan
(74) *Attorney, Agent, or Firm* — Hauptman Ham, LLP (57) ABSTRACT

An IoT network management method and an IoT network server and a terminal applying the same are provided. According to the IoT network management method, when a network joining request is received from the terminal, the IoT network server determines whether to allow the corresponding terminal to join, and, when an environment configuration request is received from the terminal, the IoT network server transmits environment configuration information which is information regarding a communication environment of the corresponding terminal. Accordingly, the terminal and the IoT network server can efficiently manage (Continued)

a network while following the LoRaWAN standards, and also, can change a network path to an effective network path when the surrounding network environment changes or a gateway breaks down, and can achieve stable data transmission by minimizing a data collision between large-scale facilities within a predetermined distance.

7 Claims, 6 Drawing Sheets

(56) References Cited

U.S. PATENT DOCUMENTS

| | | | | |
|---|---|---|---|---|
| 2013/0288644 | A1* | 10/2013 | Schroeder | H04W 8/06 |
| | | | | 455/411 |
| 2015/0365278 | A1* | 12/2015 | Chakrabarti | H04W 4/70 |
| | | | | 370/254 |
| 2017/0063605 | A1* | 3/2017 | Cheng | H04L 41/0668 |
| 2017/0093861 | A1* | 3/2017 | Kesavan | H04L 41/12 |
| 2017/0244600 | A1* | 8/2017 | Hussein | H04L 67/20 |
| 2017/0257794 | A1* | 9/2017 | Kim | H04W 76/28 |
| 2018/0376417 | A1* | 12/2018 | Wang | H04L 67/12 |

OTHER PUBLICATIONS

International Search Report for corresponding international application PCT/KR2017/014682 dated Sep. 12, 2018, citing the above references.

* cited by examiner

|  |  | Transmission gateways (offset) | | | |
|---|---|---|---|---|---|
|  |  | Gateway A | Gateway B | Gateway C | Gateway D |
| Communication order (Index) | 1 | 0:00:00 | 0:00:30 | 0:01:00 | 0:01:30 |
|  | 2 | 0:02:00 | 0:02:30 | 0:03:00 | 0:03:30 |
|  | 3 | 0:04:00 | 0:04:30 | 0:05:00 | 0:05:30 |
|  | 4 | 0:06:00 | 0:06:30 | 0:07:00 | 0:07:30 |
|  | 5 | 0:08:00 | 0:08:30 | 0:09:00 | 0:09:30 |
|  | ... | ... | ... | ... | ... |

IOT NETWORK MANAGEMENT METHOD FOR MANAGING LORAWAN-BASED LARGE-SCALE FACILITIES, AND IOT NETWORK SERVER AND TERMINAL APPLYING THE SAME

TECHNICAL FIELD

The present disclosure relates to an Internet of Things (IoT) network management method, and an IoT network server and a terminal applying the same, and more particularly, to an IoT network management method for managing long range (LoRa) wide area network (WAN) (LoRaWAN)-based large scale facilities, and an IoT network server and a terminal applying the same.

BACKGROUND ART

The information disclosed herein is presented as background information only to assist with an understanding of embodiments, and is not applicable as prior art.

LoRa refers to low power wide area (LPWA) technology that helps things exchange communications with one another. Compared with other communication networks. LoRa enables long-range communication using low power and thus may be referred to as an IoT dedicated network.

Since LoRa modules support long range communication (a visibility range of 10 km or more) using low power, the LoRa modules may be utilized to meter in facilities or gas meters or to collect metering data of facilities. LoRa enables long-range transmission of data, but has a slow transmission rate (0.250 bps) and requires a long transmission time (2-4 seconds). Therefore, when metering data generated from hundreds of large-scale facilities within a communication distance (a few kilometers) are transmitted, the data may frequently collide with one another.

In a facility where it is difficult to always supply power, LoRa communication may be activated by a battery. Therefore, power efficiency may be reduced when re-transmission is tried due to frequent data collision.

A LoRaWAN standard protocol may be configured by a terminal having a LoRa module mounted therein, a gateway for relaying data from the terminal and transmitting the data to a server, and a network server for collecting and managing data. Accordingly, in LoRaWAN-based communication, a plurality of end-node terminals corresponding to facilities having LoRa modules mounted therein transmit data to a network server via LoRaWAN gateways. However, network paths of large-scale facilities and a resource management transmission success rate of the gateway are fixed to set values at the time of initial installation, and are managed. Therefore, there may a difficulty in reflecting a change in a surrounding environment. For example, when an abnormal operation such as a breakdown occurs in the pre-set gateway in the middle of the network, data of metering facilities set to the corresponding gateway may not be transmitted to the network server.

Therefore, there is a demand for a method for minimizing data collision when data of large-scale facilities are collected by using LoRa communication, and for efficiently managing network resources.

DISCLOSURE

Technical Problem

The present disclosure has been developed in order to address the above-discussed deficiencies of the prior art, and an object of the present disclosure is to provide an IoT network management method, which, when a network joining request is received from a terminal, determines whether to allow the corresponding terminal to join, and, when an environment configuration request is received from the terminal, transmits environment configuration information which is information regarding a communication environment of the corresponding terminal, and an IoT network server and a terminal applying the same.

The technical objects that can be achieved by the present disclosure are not limited to those mentioned in the above, and other technical objects that are not mentioned herein can be clearly understood by a person skilled in the art based on the following descriptions.

Technical Solution

According to an embodiment of the present disclosure to achieve the above-described objects, an IoT network management method of an IoT network server includes: when a network joining request is received from a terminal, determining whether to allow the corresponding terminal to join; and, when an environment configuration request is received from the terminal, transmitting environment configuration information which is information regarding a communication environment of the corresponding terminal.

In addition, the environment configuration information may include gateway information, communication period information, communication order information, and offset information corresponding to the corresponding terminal.

In addition, the offset information may include a different value which is designated for each gateway.

In addition, the method may further include communicating with the corresponding terminal over a communication period from a defined time according to the communication order information, the communication period information, and the offset information.

In addition, the method may further include determining whether data reception succeeds by using signal reception success rate information regarding communication with the corresponding terminal.

In addition, the method may further include, when the data reception fails a specific number of times or more, changing a gateway relaying communicating with the corresponding terminal.

In addition, the changing may include changing to a gateway that has a largest average signal strength among gateways.

In addition, the changing may include, when it is impossible to change the gateway, changing the communication order of the corresponding terminal to have a first priority in the corresponding gateway.

In addition, the IoT network may be a LoRa network.

According to an embodiment of the present disclosure, an IoT network server includes: a communication unit configured to receive at least one of a network joining request and an environment configuration request from a terminal via a gateway; and a control unit configured to, when the network joining request is received from the terminal, determine whether to allow the corresponding terminal to join, and, when the environment configuration request is received from the terminal, to transmit environment configuration information which is information regarding a communication environment of the corresponding terminal to the corresponding terminal.

According to an embodiment of the present disclosure, an IoT network management method of a terminal which communicates with an IoT network server via a gateway includes: transmitting a network joining request to the IoT network server, and receiving information regarding whether the terminal is allowed to join from the IoT network server, and transmitting an environment configuration request to the IoT network server, and receiving environment configuration information which is information regarding a communication environment of the terminal from the IoT network server.

According to an embodiment of the present disclosure, an IoT network terminal which communicates with an IoT network server via a gateway includes: a control unit configured to control to transmit at least one of a network joining request and an environment configuration request to the IoT network server; and a communication unit configured to receive information regarding whether the IoT network terminal is allowed to join from the IoT network server, and to receive environment configuration information which is information regarding a communication environment of the corresponding terminal from the IoT network server.

Advantageous Effects

According to various embodiments of the present disclosure, an IoT network management method, which, when a network joining request is received from a terminal, determines whether to allow the corresponding terminal to join, and, when an environment configuration request is received from the terminal, transmits environment configuration information which is information regarding a communication environment of the corresponding terminal, and an IoT network server and a terminal applying the same are provided. Accordingly, the terminal and the IoT network server can efficiently manage a network while following the LoRaWAN standards, and also, can change a network path to an effective network path when the surrounding network environment changes or a gateway breaks down, and can achieve stable data transmission by minimizing a data collision between large-scale facilities within a predetermined distance.

The effects that can be achieved by the present disclosure are not limited to those mentioned in the above, and other effects that are not mentioned herein can be clearly understood by a person skilled in the a based on the following descriptions.

DESCRIPTION OF DRAWINGS

For a more complete understanding of the present disclosure, the accompanying drawings, included as a part of the detailed description, provide embodiments of the present disclosure, and explain technical features of the present disclosure in conjunction with the detailed description, in which.

BEST MODE

The present disclosure will now be described more fully with reference to specific embodiments of the present disclosure illustrated in the accompanying drawings to clarify features and advantages of the present disclosure.

In the following description and the accompanying drawings, well-known functions or constructions are not described in detail since they would obscure the present disclosure in unnecessary detail. In addition, it should be noted that, throughout the drawings, the same reference numerals are used for the same elements if possible.

Terms or words used in the following description and drawings should not be interpreted as being limited to general and dictionary definition, and should be interpreted as having definitions and concepts suitable for the technical idea of the present disclosure, based on the principle that the inventors can appropriately define the terms as concepts for explaining their invention in the best method.

Accordingly, the constructions illustrated in the embodiments of the detailed description and the drawings are merely the most preferred embodiment of the present disclosure, and do not represent all technical ideas of the present disclosure. Therefore, the embodiments should be construed as including various equivalents and variations substituted therefor at the time of filing.

The terms such as "first" or "second" used in various embodiments may be used to explain various elements and to distinguish one element from another element, but do not limit the elements. For example, without departing the scope of the present disclosure, a second element may be referred to as a first element, and similarly, a first element may be referred to as a second element.

It will be understood that when an element is referred to as being "coupled to" or "connected to" another element, it can be logically or physically coupled or connected to another element.

In other words, an element may be directly coupled or connected to another element, but there may be an intervening element therebetween or the element may be indirectly coupled or connected to another element.

The terms "include" or "have" used in the detailed description indicate the presence of features, numbers, steps, operations, elements, components or a combination thereof described in the detailed description, and do not preclude the presence or addition of one or more other features, numbers, steps, operations, elements, components, or a combination thereof.

The terms "unit" and "module" and the terms having suffix "-er" or "-or" used in the detailed description refer to a unit for processing at least one function or operation, and may be implemented by hardware, software, or a combination of hardware and software.

As used herein, the terms "a". "an," "one." "the," and similar terms thereto are intended to include the singular forms and the plural forms, unless the context describing the present disclosure (in particular, the context of claims presented below) clearly indicates otherwise.

Hereinafter, the present disclosure will be described in detail with reference to the accompanying drawings.

Figure 1:
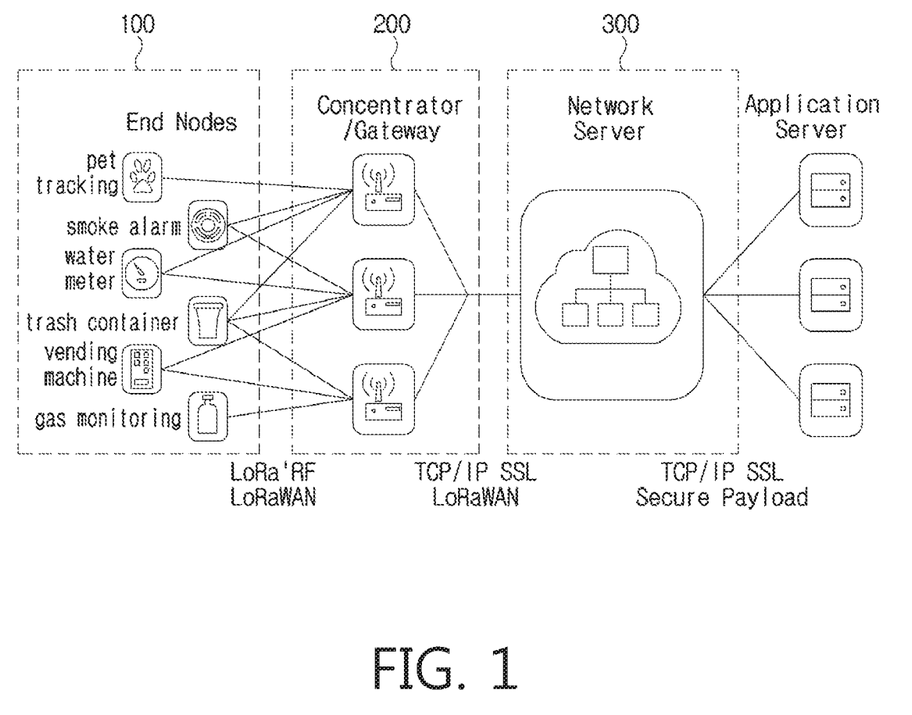
FIG. 1 is a view schematically illustrating a LoRa network environment according to an embodiment of the present disclosure.

FIG. 1 is a view schematically illustrating a LoRa network environment according to an embodiment of the disclosure.

As shown in FIG. 1, a LoRa network (LoRa wide area network (LoRaWAN)) includes a plurality of IoT network terminals (end nodes) 100, a plurality of gateways 200, and an IoT network server (network server) 300.

In the LoRa network environment, the plurality of IoT network terminals 100 communicate with the IoT network server 300 via the respective gateways 200. Herein, the gateway 200 performs a role of relaying data received from the plurality of IoT network terminals arranged in the vicinity thereof, and transmitting the data to the IoT network server 300. In this case, two or more gateways 200 may receive data transmitted from one IoT network terminal 100, and may transmit the data to the IoT network server 300, and thus the IoT network server 300 may receive the data transmitted from one IoT network terminal 100 multiple times via several gateways 200. In this case, the IoT network server 300 retains only the data received via a previously set path from among the data received multiple times, and removes the other data.

In addition, an application server may receive various data from the network server and provide various services to users.

For example, as shown in FIG. 1, the IoT network terminals 100 may include a pet tracking terminal, a smoking alarm terminal, a water metering terminal, a trash container terminal, a vending machine terminal, a gas monitoring terminal, etc., and each of the IoT network terminals 100 collects sensing data by sensing through a sensor, and transmits the collected data to the plurality of gateways 200 by using LoRa radio frequency (RF) communication. The plurality of gateways 200 transmit the received data to the network server 300 by using a transmission control protocol/Internet protocol secure sockets layer (TCP/IP SSL). In this way, the LoRa network environment is configured.

Figure 2:
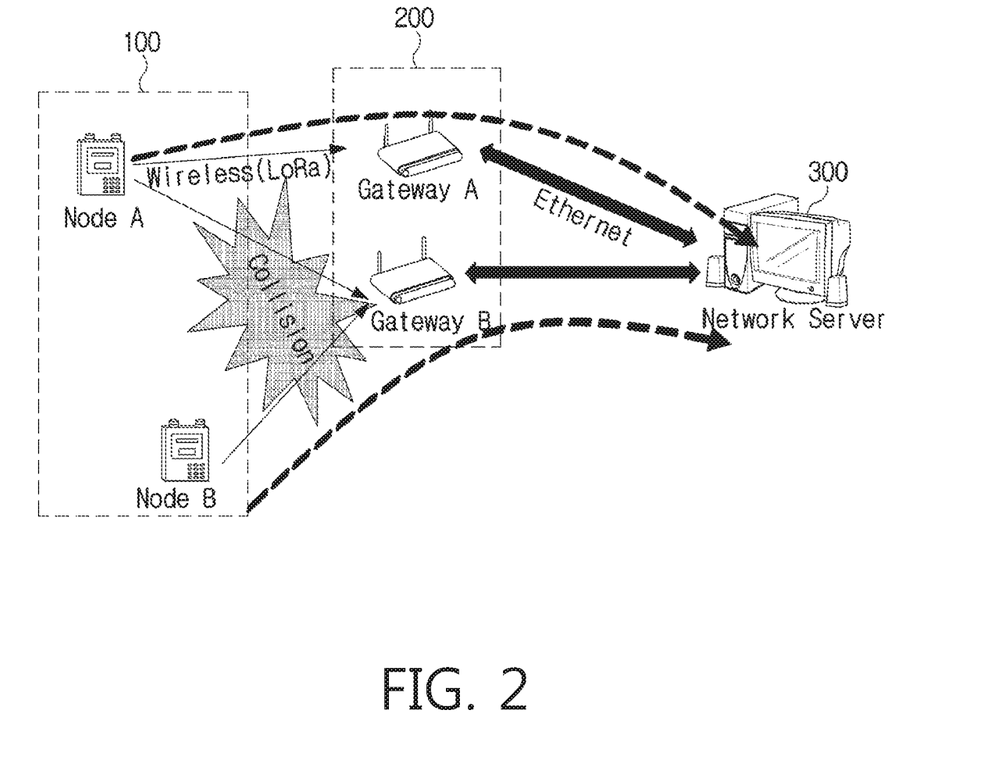
FIG. 2 is a view illustrating an example of a collision in the LoRa network environment according to an embodiment of the present disclosure.

FIG. 2 is a view illustrating an example of a collision occurring in the LoRa network environment according to an embodiment of the present disclosure.

As shown in FIG. 2, the LoRa network enables long-range communication (a visibility distance of 10 kilometers or more), and performs communication at a slow speed due to communication characteristics. Therefore, if there are many facilities within a communication transmission range, a transmission collision may occur. Specifically, when one IoT network terminal 100 transmits data, the IoT network terminal 100 transmits the data to all of the gateways 200 in the vicinity thereof. Therefore, when a data transmission time of a gateway corresponding to a pre-set path overlaps a data transmission time of another gateway, a data collision may occur.

A method for avoiding such a collision will be described hereinafter with reference to FIGS. 3 and 4.

Figure 3:
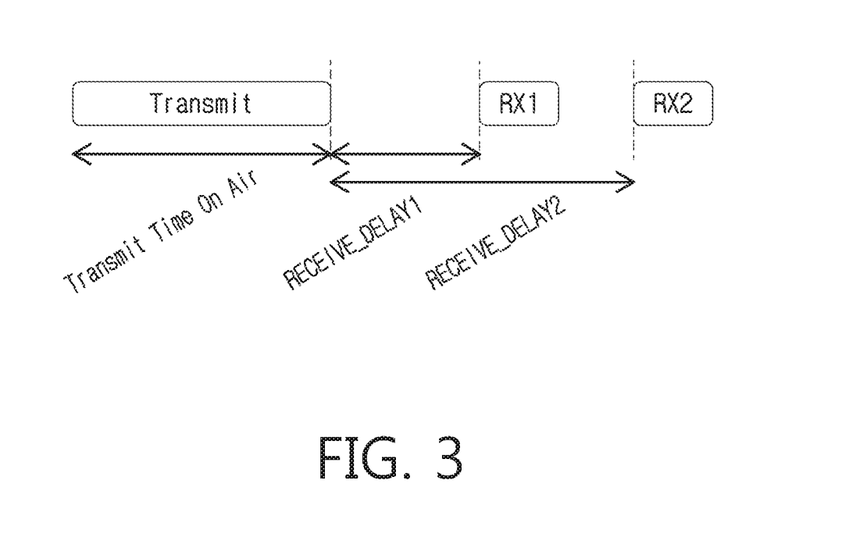
FIG. 3 is a view illustrating an example of a transmission period for avoiding a collision in the LoRa network environment according to an embodiment of the present disclosure.

FIG. 3 is a view illustrating an example of a transmission period for avoiding a collision in the LoRa network environment according to an embodiment of the present disclosure.

In the LoRa network environment, which is applied to the IoT network terminal 100 operating by a battery, the IoT network terminal 100 is turned on only when data is transmitted the IoT network server 300 through upstream communication, and goes into a sleep state to maximize power in the other states. Accordingly, the IoT network server 300 may perform downstream communication to transmit data to the IoT network terminal 100 only after upstream communication is performed. Accordingly, when there is data requiring downstream communication, the IoT network server 300 receives upstream data from the IoT network terminal 100, and then, tries to perform downstream communication via the same channel RX1 as the upstream communication. When the downstream communication fails, the IoT network server 300 transmits downstream data via a pre-defined channel (RX2: 921.90 MHz/DR0-SF12, 252 KHz in Korea) after a predetermined time. Herein, the RX1 channel requires about 5 seconds as a delay time and a transmission time for downstream communication. Accordingly, a communication period of one IoT network terminal 100 to completely perform upstream communication and downstream communication without a collision with other terminals nearby needs to be set to at least 10 seconds. In addition, this setting corresponds to a case in which data of 60 byte or less is transmitted. When data of about 200 bytes is transmitted, upstream communication should be performed four times. In this case, a communication period of one IoT network terminal 100 to completely perform upstream communication and downstream communication without a collision with other terminals nearby needs to be set to at least 40 seconds.

As described above, by setting one IoT network terminal 100 to communicate over a communication period which is set to be sufficient to enable upstream communication and downstream communication with the IoT network server 300, the IoT network server 300 can prevent a data collision between the plurality of IoT network terminals 100.

Hereinafter, an IoT network management method by the IoT network terminal 100 and the IoT network server 300 will be described in detail with reference to FIG. 4. FIG. 4 is a flowchart provided to explain an IoT network management method according to an embodiment of the present disclosure.

Figure 4:
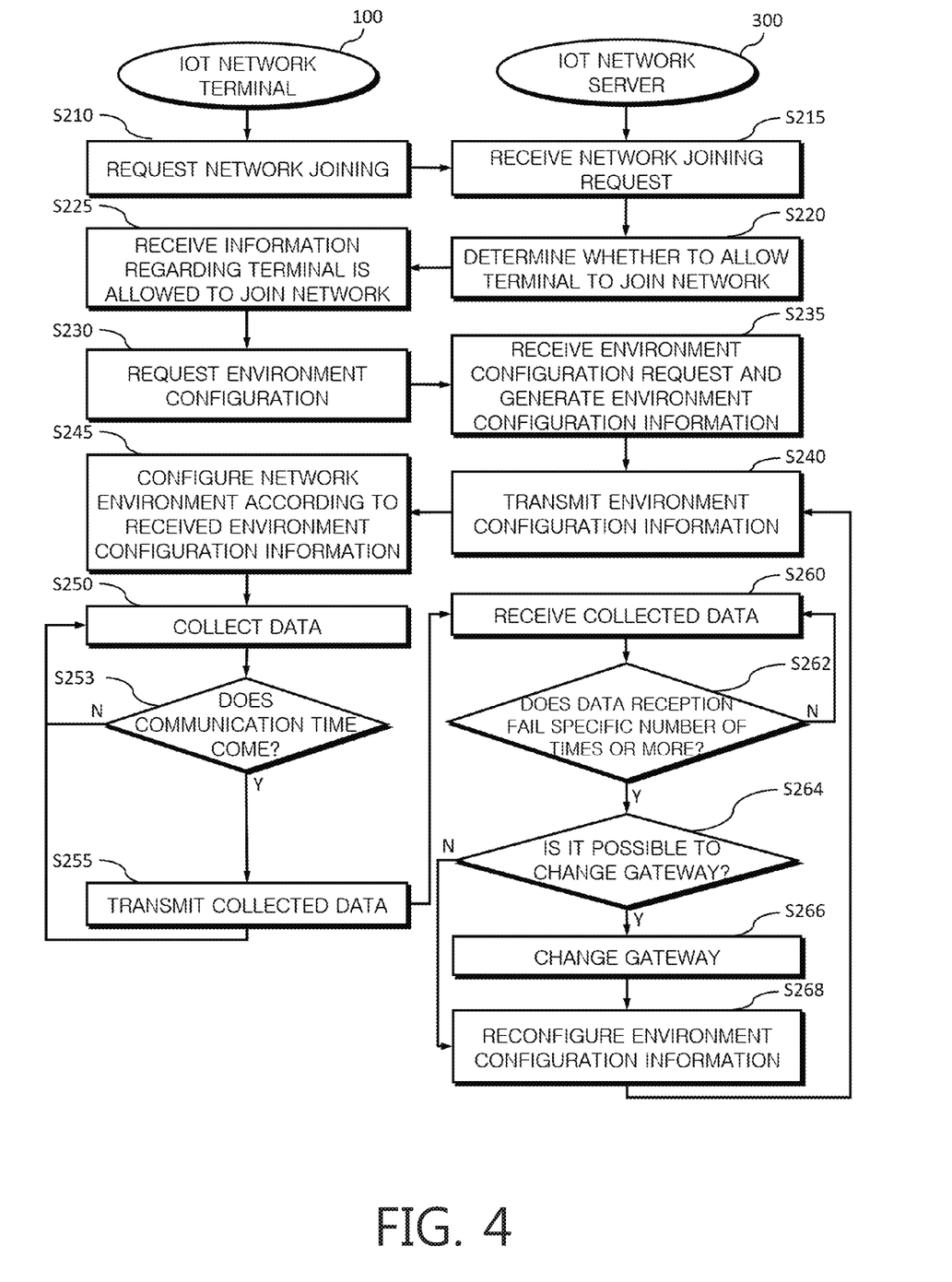
FIG. 4 is a flowchart provided to explain an IoT network management method according to an embodiment of the present disclosure.

Although FIG. 4 depicts only the IoT network terminal 100 and the IoT network server 300, a gateway 200 may be included in the way of communication between the IoT network terminal 100 and the IoT network server 300. It should be noted that the gateway 200 is omitted from FIG. 4 for convenience of explanation.

First, the IoT network terminal 100 transmits an IoT network joining request to the IoT network server 300 (S210). Then, when the IoT network joining request is received from the IoT network terminal 100 (S215), the IoT network server 300 determines whether to allow the corresponding IoT network terminal 100 to join (S220). In this process, the IoT network terminal 100 and the IoT network server 300 may use any one of an activation by personalization (ABP) method and an over the air activation (OTAA) method. The ABP method goes through an identification procedure by transmitting a network key (NetKey), an application key (AppKey), and a device address (DviceAddr) which are previously inputted for the sake of security, and the OTAA method refers to a method which transmits only an application key and device information and dynamically receives a network key from the IoT network server 300 through authentication. When the joining request is received from the IoT network terminal 100, the IoT network server 300 may identify information of the corresponding IoT network terminal 100 and determine whether to allow the IoT network terminal to join by considering whether the terminal is a terminal registered at the server and whether information of the gateway 200 matches.

When it is determined whether the terminal 100 can join (S220), the IoT network server 300 transmits information regarding whether terminal 100 can join to the IoT network terminal 100. Then, the IoT network terminal 100 receives the information regarding whether the IoT network terminal 100 can join (S225), and joins or does not join the IoT network according to the information.

When it is determined that the IoT network terminal 100 can join the IoT network, the IoT network terminal 100 requests the IoT network server 300 to configure an environment (S230). When a request for configuration of a network is received from the IoT network terminal 100, the IoT network server 300 generates environment configuration information regarding a communication environment of the IoT network terminal 100 (S235), and transmits the generated environment configuration information to the IoT network terminal 100 (S240).

Herein, the environment configuration information is configuration information regarding a network communication environment for the IoT network terminal 100, and includes gateway information, communication period information, communication order information, and offset information corresponding to the corresponding IoT network terminal 100 to prevent a collision between the terminals. Herein, the gateway information is information regarding the gateway 200 through which the IoT network terminal 100 passes in the middle of communication with the IoT network server 300, and may include a media access control (MAC) address and an IP address of the corresponding gateway 200. The communication period information indicates a communication period over which the IoT network terminal 100 can perform upstream communication and downstream communication with the IoT network server 300 without a collision with other terminals, and may be, for example, a period of 30 seconds or 40 seconds. The communication order information indicates in what order the IoT network terminal 100 proceeds with communication in the gateway 200, and for example, may be the first priority, the second priority, or the third priority. The offset information indicates offset time values applied to prevent communication times from overlapping one another among the plurality of gateways 200, and a different offset time value may be designated for each of the plurality of gateways 200. For example, the offset information may be 30 seconds, 1 minute, 1 minute and 30 seconds, 2 minutes according to each gateway.

An example of the environment configuration information described above is illustrated in FIG. 6 and will be described later.

The IoT network terminal 100 configures the IoT network environment according to the received environment configuration information (S245).

Thereafter, the IoT network terminal 100 and the IoT network server 300 communicate with each other over a communication period from a pre-defined time, based on the communication order information, the communication period information, and the offset information included in the environment configuration information.

Specifically, the IoT network terminal 100 collects data by using sensors (S250). The IoT network terminal 100 identifies whether a communication time according to the environment configuration information comes (S253). In this case, the communication time of the IoT network terminal 100 may be calculated by the following equation:

$$\text{communication time of the IoT network terminal} = \text{communication order} * \text{communication period} + \text{offset} \quad \text{Equation 1}$$

Figure 6:
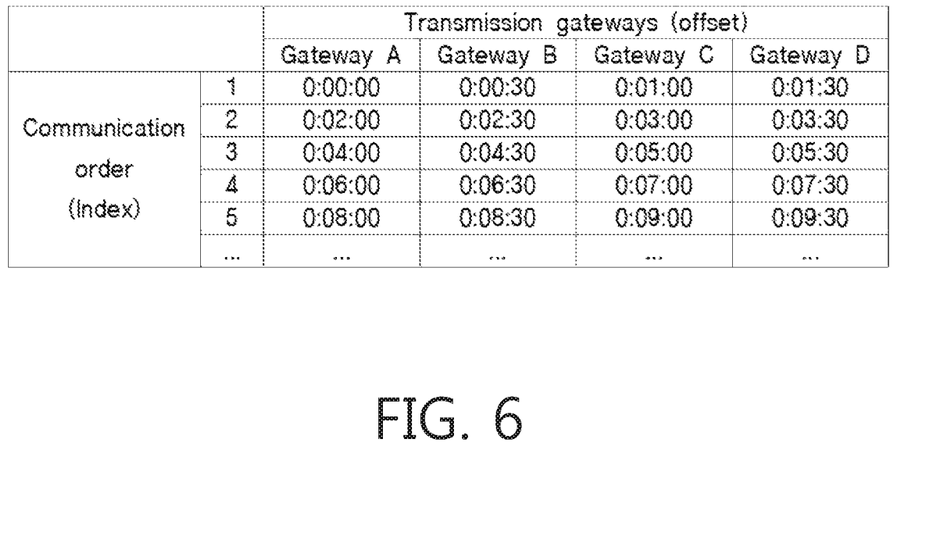
FIG. 6 is a view illustrating a table displaying communication times for each terminal according to an embodiment of the present disclosure.

The communication times calculated by Equation 1 are illustrated in the table of FIG. 6 by way of an example.

When the communication time does not come (S253-N), the IoT network terminal 100 continuous collecting data (S250). On the other hand, when it is identified that the communication time comes (S253-Y), the IoT network terminal 100 transmits the collected data to the IoT network server 300 (S255).

Then, the IoT network server 300 receives the collected data from the IoT network terminal 100 (S260). Then, the IoT network server 300 determines whether data reception succeeds by using signal reception success rate information regarding communication with the IoT network terminal 100, and determines whether data reception fails a specific number of times or more (S262).

When data reception does not fail the specific number of times or more (262-N), the IoT network server 300 continuously receives data from the IoT network terminal 100 (S260).

On the other hand, when data reception fails the specific number of times or more (S262-Y), the IoT network server 300 determines whether it is possible to change the gateway 200 (S264). When there is another available gateway 200 in the vicinity of the corresponding IoT network terminal 100, the IoT network server 300 determines that it is possible to change the gateway, and, where there is no available gateway 200 in the vicinity of the corresponding IoT network terminal 100, the IoT network server 300 determines that it is impossible to change the gateway.

When it is possible to change the gateway (S264-Y), the IoT network server 300 may change the gateway 200 relaying communication with the corresponding IoT network terminal 100 to another gateway (S266). In this case, the IoT network server 300 may change the gateway to a gateway having a greatest average signal strength among the plurality of gateways 200. To achieve this, the IoT network server 300 may reconfigure the environment configuration information regarding the corresponding IoT network terminal 100 by applying the changed gateway 200 (S268), and may transmit the reconfigured environment configuration information to the corresponding IoT network terminal 100 (S240).

On the other hand, when it is impossible to change the gateway (S264-Y), the IoT network server 300 may reconfigure the environment configuration information to change the communication order of the corresponding IoT network terminal 100 to have the first priority in the corresponding gateway 200 (S268), and may transmit the reconfigured environment configuration information to the IoT network terminal 100 (S240).

In addition, when it is impossible to change the gateway (S264-Y), the IoT network server 300 may reconfigure the environment configuration information to increase the communication time of the corresponding IoT network terminal 100, and may transmit the reconfigured environment configuration information to the corresponding IoT network terminal 100. Since the corresponding IoT network terminal 100 frequently fails to transmit, the IoT network server 300 may reduce the possibility of transmission failure by assigning more communication time to the corresponding IoT network terminal 100.

Through the above-described method, the IoT network terminal 100 and the IoT network server 300 communicate with each other through the gateway 200, and accordingly, can efficiently manage the network while following the LoRaWAN standards, and also, can change a network path to an effective network path when the surrounding network environment changes or the gateway breaks down, and can achieve stable data transmission by minimizing a data collision between large-scale facilities within a predetermined distance.

Although FIG. 4 depicts that one IoT network terminal 100 communicates with the IoT network server 300, it should be noted that the above-described process can be performed with respect to each of the plurality of IoT network terminals 100 along with the IoT network server 300.

Figure 5:
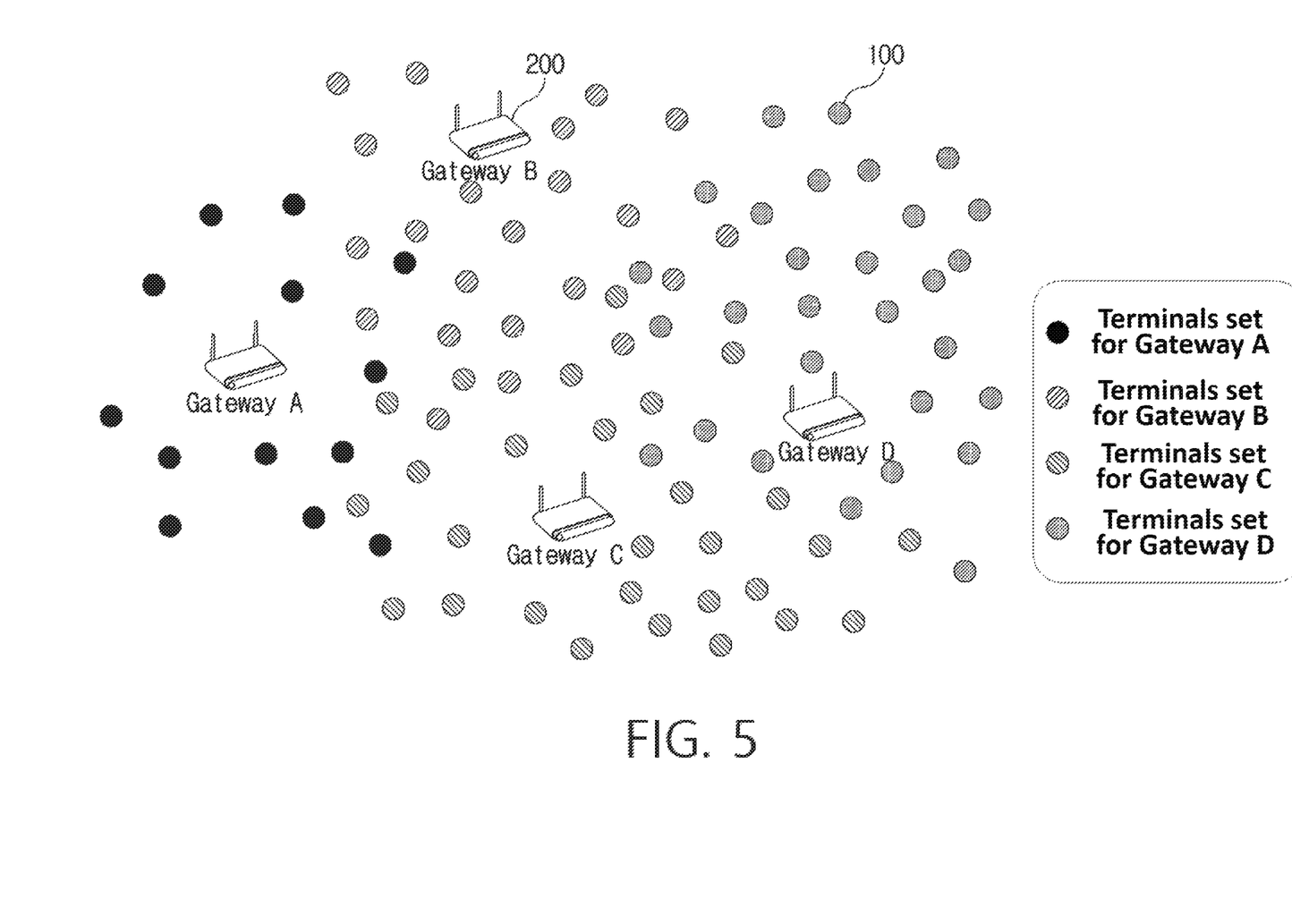
FIG. 5 is a view illustrating an example of an environment in which terminals are assigned to each gateway according to an embodiment of the present disclosure.

Specifically, FIG. 5 is a view illustrating the plurality of IoT network terminals 100 and the gateways 200 arranged.

FIG. 5 is a view illustrating an example of an environment in which the terminals are assigned to each gateway according to an embodiment of the present disclosure. It can be seen from FIG. 5 that four gateways 200 in total are included and the plurality of IoT network terminals 100 are assigned to one gateway 200, respectively.

In the IoT network environment described above, tens to hundreds of IoT network terminals 100 may be assigned to one gateway 200. Accordingly, the IoT network terminal 100 which periodically receives a measurement value like a facility including a smart meter, a meter, or the like may be woken every communication time calculated according to the environment configuration information (for example, every six hours), and may transmit data to the IoT network server 300 via the gateway 200 assigned over a predetermined time. In the case of the plurality of IoT network terminals 100 assigned to one gateway 200, the plurality of IoT network terminals 100 may be assigned communication orders (indexes) according to the registered communication order information, and may be set to be woken at different times.

FIG. 6 is a table showing a communication time of each terminal according to an embodiment of the present disclosure. When there are several gateways 200 in a nearby region, the IoT network server 300 can minimize a data collision between the gateways 200 by applying different offset time values to the gateways. For example, the IoT network server 300 may set an offset time value of a gateway A to 0 second, an offset time value of a gateway B to 30 seconds, an offset time value of a gateway C to 60 seconds, and an offset time value of a gateway D to 90 seconds. Accordingly, by setting different offset time values to adjacent gateways, even the IoT network terminals 100 having the same period and the same order may have different communication times since the different gateways have different offset time values. Therefore, a data collision may not occur when data is transmitted. Since the IoT network terminals 100 perform communication every 30 seconds, respectively, according to the communication time table illustrated in FIG. 6, a data collision may not occur.

Hereinafter, schematic configurations of the IoT network terminal 100 and the IoT network server 300 will be described with reference to FIGS. 7 and 8.

Figure 7:
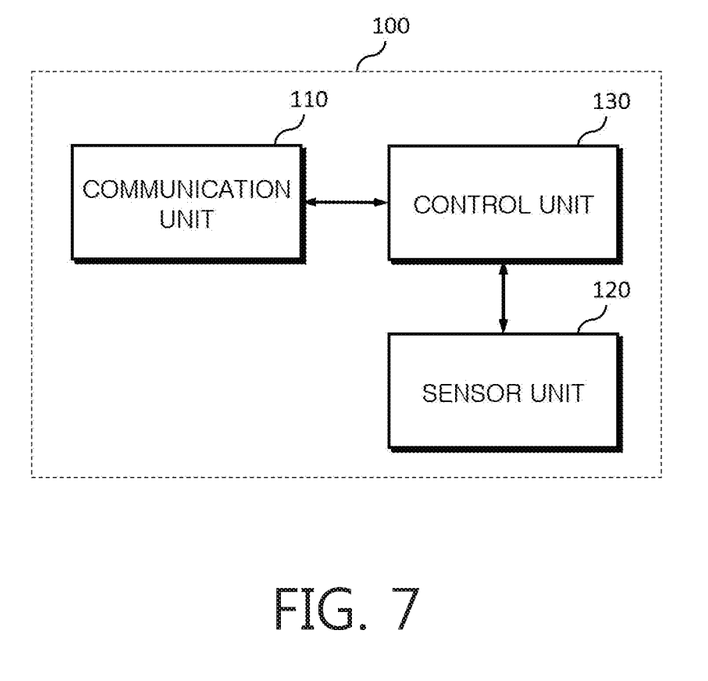
FIG. 7 is a view illustrating a schematic structure of an IoT network terminal according to an embodiment of the present disclosure.

FIG. 7 is a view illustrating a schematic structure of the IoT network terminal 100 according to an embodiment of the present disclosure.

The IoT network terminal 100 shown in FIG. 7 is connected with the IoT network server 300 to be able to communicate therewith via the gateway 200, and may perform functions of collecting data by using various sensors and transmitting the collected data. As shown in FIG. 7, the IoT network terminal 100 includes a communication unit 10, a sensor unit 120, and a control unit 130.

The communication unit 110 is connected with the gateway 200 assigned according to IoT network environment configuration information to be able to communicate therewith, and transmits data sensed and collected through the sensor unit 120 to the IoT network server 300 via the gateway 200. The communication unit 110 may be connected with the gateway 200 wirelessly via an IoT network, and may perform communication by using RF communication (for example. Bluetooth. Zigbee, etc.). In addition, the communication unit 110 may receive information regarding whether it is possible to join from the IoT network server 300, and may receive environment configuration information which is information regarding a communication environment from the IoT network server 300.

The sensor unit 120 includes various sensors according to purposes, and may collect sensing data sensed through the sensors. The sensor unit 120 may include various sensors such as a temperature sensor, a smoking sensor, a humidity sensor, or the like according to purposes.

The control unit 130 controls an overall operation of the IoT network terminal 100. Specifically, the control unit 130 may control to transmit at least one of a network joining request and an environment configuration request to the IoT network server, and accordingly, controls the IoT network terminal 100 to communicate with the IoT network server 300 as described above with reference to FIG. 4.

Figure 8:
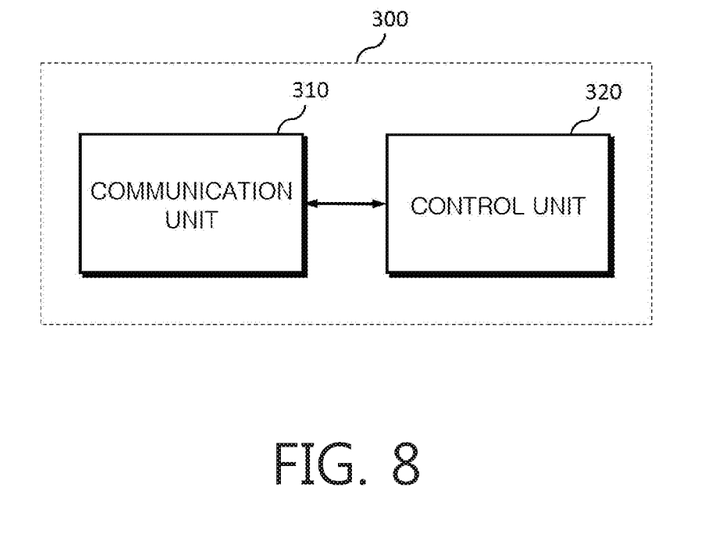
FIG. 8 is a view illustrating a schematic structure of an IoT network server according to an embodiment of the present disclosure.

FIG. 8 is a view illustrating a schematic structure of the IoT network server 300 according to an embodiment of the present disclosure.

The IoT network server 300 illustrated in FIG. 8 is connected with the IoT network terminal 100 to be able to communicate therewith via the gateway 200, and performs a function of managing the IoT network environment including the plurality of IoT network terminals 100 and the plurality of gateways 200. Although the name of the IoT network server 300 is the server, the IoT network server is not limited to a server computer, and any device that manages a normal PC or an IoT network can be applied. As shown in FIG. 8, the IoT network server 300 includes a communication unit 310 and a control unit 320.

The communication unit 310 may be connected with the plurality of IoT network terminals 100 to be able to communicate therewith via the plurality of gateways 200, and may be connected wiredly or wirelessly. In addition, the communication unit 310 may receive at least one of a network joining request and an environment configuration request from the IoT network terminal 100 via the gateway.

The control unit 320 controls an overall operation of the IoT network server 300. Specifically, the control unit 320 controls to determine whether to allow the IoT network terminal to join when a network joining request is received from the IoT network terminal 100, and to transmit environment configuration information, which is information regarding a communication environment of the corresponding terminal, to the corresponding terminal when an environment configuration request is received from the IoT network terminal 100. Accordingly, the control unit 320 controls the IoT network server 300 to communicate with the IoT network terminal 100 as described above with reference to FIG. 4.

In the present embodiment, the IoT network is the LoRa network. However, this should not be considered as limiting, and any IoT network can be applied. For example, the IoT network may be a narrowband IoT (NB-IoT).

The technical idea of the present disclosure may be applied to a computer-readable recording medium which records a computer program for performing the functions of the IoT network terminal 100 and the IoT network server 300, and the IoT network management method according to the present embodiments. In addition, the technical idea according to various embodiments of the present disclosure may be implemented in the form of a computer-readable programming language code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, a flash memory, a solid state disk (SSD), or the like. A computer-readable code or program that is stored in the computer readable recording medium may be transmitted via a network connected between computers.

Although the detailed description and drawings describe a configuration of an exemplary device, an implemented thing of an functional operation and a subject explained in the detailed description may be implemented by different types of digital electronic circuits, or may be implemented by computer software, firmware, or hardware including the structure disclosed in the detailed description and a structural equivalent thereto, or may be implemented by a combination of one or more of computer software, firmware, or hardware.

Accordingly, while exemplary embodiments have been particularly shown and described above, it will be understood by those of ordinary skill in the att that various changes in form and details may be made therein without departing from the spirit and scope.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

The invention claimed is:

1. An Internet of Things (IoT) network management method of an IoT network server, the method comprising:
  when a network joining request is received from a terminal, determining whether to allow the corresponding terminal to join;
  when an environment configuration request is received from the terminal, transmitting environment configuration information which is information regarding a communication environment of the corresponding terminal, wherein the environment configuration information comprises gateway information, communication period information, communication order information, and offset information corresponding to the corresponding terminal;
  communicating with the corresponding terminal over a communication period from a defined time according to the communication order information, the communication period information, and the offset information, wherein the offset information comprises a different value which is designated for each gateway;
  determining whether data reception succeeds by using signal reception success rate information regarding communication with the corresponding terminal; and
  when the data reception fails a specific number of times or more, changing the gateway relaying communicating with the corresponding terminal.

2. The method of claim 1, wherein the changing comprises changing to a gateway that has a largest average signal strength among gateways.

3. The method of claim 2, wherein the changing comprises, when it is impossible to change the gateway, changing the communication order of the corresponding terminal to have a first priority in the corresponding gateway.

4. The method of claim 1, wherein the IoT network is a LoRa network.

5. An Internet of Things (IoT) network server comprising:
  a communication unit configured to receive at least one of a network joining request and an environment configuration request from a terminal via a gateway; and
  a control unit configured to,
    when the network joining request is received from the terminal, determine whether to allow the corresponding terminal to join,
    when the environment configuration request is received from the terminal, to transmit environment configuration information which is information regarding a communication environment of the corresponding terminal to the corresponding terminal wherein the environment configuration information comprises gateway information, communication period information, communication order information, and offset information corresponding to the corresponding terminal,
    communicate with the corresponding terminal over a communication period from a defined time according to the communication order information, the communication period information, and the offset information, wherein the offset information comprises a different value which is designated for each gateway,
    determining whether data reception succeeds by using signal reception success rate information regarding communication with the corresponding terminalc and
    when the data reception fails a specific number of times or more, change the gateway relaying communicating with the corresponding terminal.

6. An Internet of Things (IoT) network management method of a terminal which communicates with an IoT network server via a gateway, the method comprising:
  transmitting a network joining request to the IoT network server, and receiving information regarding whether the terminal is allowed to join from the IoT network server;
  transmitting an environment configuration request to the IoT network server, and receiving environment configuration information which is information regarding a communication environment of the terminal from the IoT network server, wherein the environment configuration information comprises gateway information, communication period information, communication order information, and offset information corresponding to the corresponding terminal; and
  communicating with the IoT network server over a communication period from a defined time according to the communication order information, the communication period information, and the offset information, wherein the offset information comprises a different value which is designated for each gateway, wherein the IoT network server determines whether data reception succeeds by using signal reception success rate information regarding communication with the terminal, and changes the gateway relaying communicating with the terminal when the data reception fails a specific number of times or more.

7. An Internet of Things (IoT) network terminal which communicates with an IoT network server via a gateway, the IoT network terminal comprising:

a control unit configured to control to transmit at least one of a network joining request and an environment configuration request to the IoT network server; and a communication unit configured to receive information regarding whether the IoT network terminal is allowed to join from the IoT network server, receive environment configuration information which is information regarding a communication environment of the corresponding terminal from the IoT network server, wherein the environment configuration information comprises gateway information, communication period information, communication order information, and offset information corresponding to the corresponding terminal, and communicate with the IoT network server over a communication period from a defined time according to the communication order information, the communication period information, and the offset information, wherein the offset information comprises a different value which is designated for each gateway, wherein the IoT network server determines whether data reception succeeds by using signal reception success rate information regarding communication with the terminal, and changes the gateway relaying communicating with the terminal when the data reception fails a specific number of times or more.

\* \* \* \* \*